June 15, 1965  C. W. LINDSLEY ETAL  3,188,723
METHOD OF ASSEMBLING ELECTRON DISCHARGE TUBES
Filed Oct. 31, 1963  3 Sheets-Sheet 1

INVENTORS:
ERNST R. LARSON &
BY CHARLES W. LINDSLEY

William A. Zalesak
Attorney

INVENTORS
ERNST R. LARSON &
BY CHARLES W. LINDSLEY

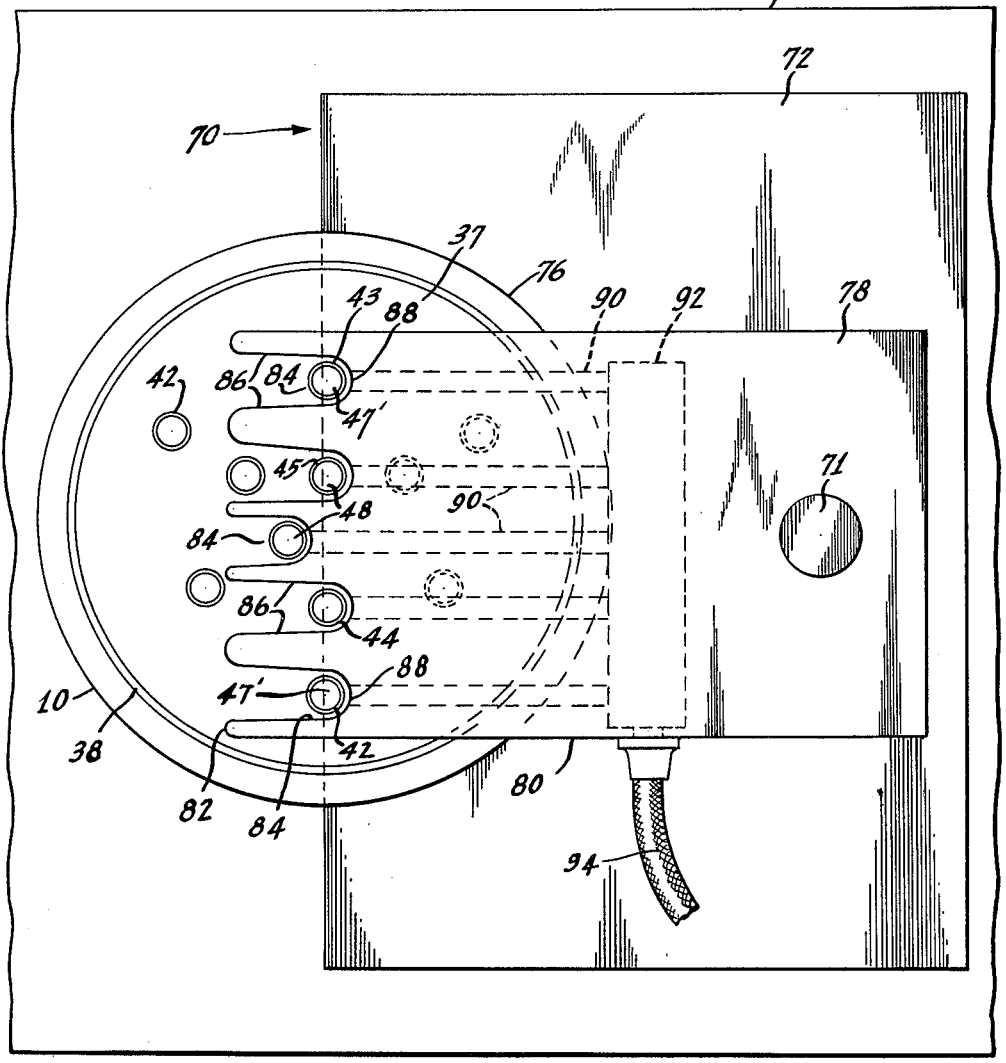

** 3,188,723
METHOD OF ASSEMBLING ELECTRON
DISCHARGE TUBES
Charles W. Lindsley, Cresskill, and Ernst R. Larson,
Fords, N.J., assignors to Radio Corporation of America, a corporation of Delaware
Filed Oct. 31, 1963, Ser. No. 320,271
3 Claims. (Cl. 29—155.5)

This invention relates to the assembly of electron discharge tubes, and particularly to a method of rapidly assembling small and fragile parts of electron discharge tubes without damaging the parts.

For one recently designed type of electron discharge tube, hereinafter described, the method of assembly involves loading a plurality of tubular electrodes into telescoped vertical orientation within a jig, placing an electrode support flange on the upwardly extending end of each electrode, assembling a header wafer into the jig and spaced from the electrodes and flanges, and passing a support and conductive lead through each of a plurality of bores in the wafer. The leads extend loosely through the bores and the end of the leads engage and rest on the flanges. Thereafter, a brazing material washer is threaded onto each of the leads extending outwardly from the header wafer, and the loaded jig is heated to melt and cause flow of the brazing material for brazing together the various electrodes, flanges, leads and wafers.

A problem associated with the method described relates to the threading of the brazing material washers onto the leads. In one electron discharge tube, 11 leads of 16 mils diameter are used which are all disposed within a circle of 300 mils diameter. The brazing material washers have an inner diameter of 20 mils and an outer diameter of 40 mils. In order to facilitate threading of the brazing material washers onto the leads, a brazing washer assembly comprising 11 inter-connected washers is used whereby the washers may be simultaneously assembled on the leads. Because of the small spacings between the leads and the relatively small size of the washer openings as compared to the diameter of the leads, it is necessary that each of the leads be accurately positioned with respect to the other leads and with respect to the washer assembly to permit simultaneous threading of the washer assembly onto the leads. As mentioned, the leads extend loosely through the header wafer and rest on the flanges prior to brazing. Because of the loose fit of the leads through the wafer bores, the leads are often tilted, and prior to threading of the washer assembly over the leads, the leads should be accurately positioned. Manual positioning of the closely spaced tilted leads is a difficult, tedious and costly process.

The problem is further complicated by the fact that the tube electrodes are very small and fragile, and, prior to brazing, the flanges are balanced on the ends of the electrodes while the ends of the leads rest on the flanges. Thus, during positioning of the leads, the slightest longitudinal movement of the leads may cause the leads to fall off the flanges, or the flanges to become tilted, or the electrodes to be damaged.

Although means are known for automatically positioning each of a plurality of leads without causing longitudinal movement of the leads, such means are complicated, expensive and relatively slow in operation.

It is an object of this invention, therefore, to provide an improved method of threading brazing washers onto the leads of a tube assembly of the type described, and particularly to provide a new and novel method of rapidly, accurately and inexpensively positioning the leads prior to threading of a brazing material washer onto each of the leads without causing longitudinal movement of the leads and the problems caused by such movement.

For achieving the objects of this invention, a comb or gathering means may be employed which comprises a plurality of tapered slots extending inwardly from an edge of the comb. One slot is provided for and corresponds to each of the leads to be positioned. Opening into the otherwise closed end of each slot is a bore which communicates with an exhaust means. The method of this invention, in brief, comprises positioning a loaded jig so that the leads extend perpendicular to the plane of the comb means, and moving the jig so as to move the leads transversely of their lengths and inwardly of the slots. Each of the leads is positioned closely adjacent or against the closed end of its corresponding slot, and each of the leads is thereafter urged and maintained against the closed end of its corresponding slot by the effect of the air pressure created by the exhaust bores communicating with the closed ends of the slots. The force applied against the leads is in a transverse direction only. The leads are thus accurately positioned. Thereafter, brazing material washers are threaded onto the leads.

As will be described in greater detail hereinafter, advantages of the method of this invention relate to the high speed and efficiency with which the method may be performed, the simplicity and low cost of the apparatus which may be used in the practice of the method, and the fact that no longitudinal forces are applied to the leads.

Figure 1:
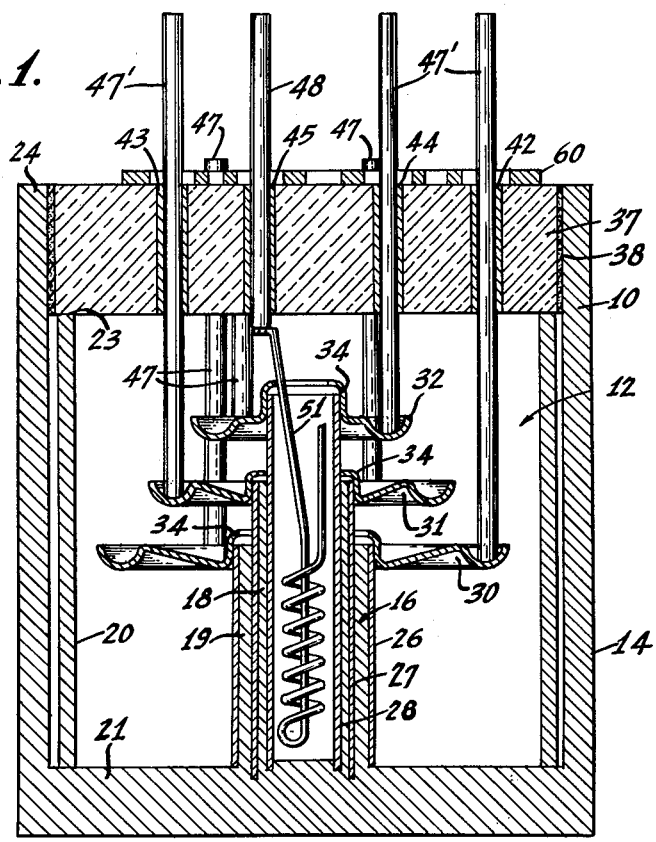
FIG. 1 is a longitudinal section of a brazing jig containing assembled parts of an electron tube mount which may be fabricated according to the method of this invention.
Figure 2:
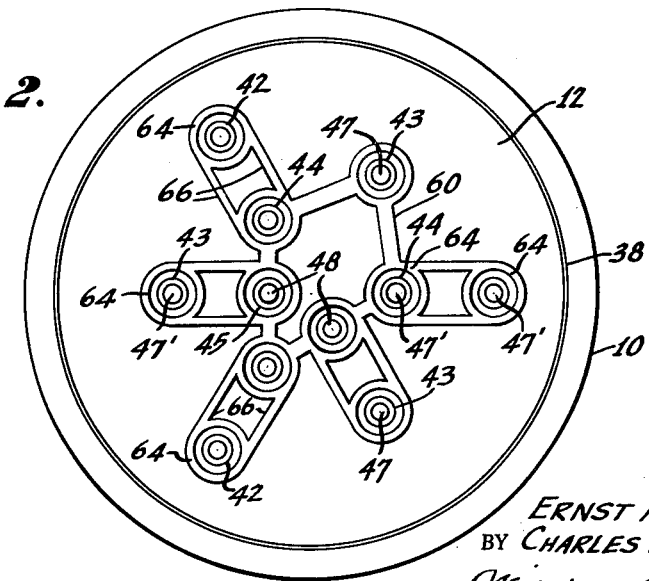
FIG. 2 is a top plan view of FIG. 1.

In FIGS. 1 and 2 is shown an assembly and brazing jig 10 containing assembled parts of an electron discharge tube mount 12. Jig 10 comprises a cup-shape shell 14 having a centrally disposed jigging assembly 16 comprising coaxial jigging cylinders 18 and 19. A circular insert 20 resting on the bottom 21 of jig 10 provides a ledge 23 within the jig adjacent the top open end 24 thereof. The tube mount 12 assembled within jig 10 comprises tubular electrodes 26 and 27 and a tubular electrode support 28 received snugly within or around the jigging cylinders 18 and 19. Mounted on the ends of the tubular electrodes 26 and 27 and support 28 are electrode support flanges 30, 31 and 32, respectively, each flange comprising a centrally disposed tubular portion 34 in which the end of a tubular electrode 26 or 27 or electrode support 28 is received. Mounted on the ledge 23 provided by insert 20 is a header wafer 37 having sets of three bores 42, 43, and 44, and a set of two bores 45 therethrough. Support and conductive leads 47, 47', and 48 extend through the bores and into engagement with the flanges and a heating element 51. As shown in FIG. 2, the bores 42, 43, 44 and 45, and hence, leads 47, 47', and 48, are arranged in a preselected pattern.

The joints between the various contacting mount parts, with the exception of heater 51 and leads 48 are made by brazing. Heater element 51 is secured to leads 48 in a preliminary operation, as by crimping. Brazing material for providing the brazed joints between the electrodes 26 and 27 and the electrode support 28 and the flanges 30, 31 and 32, and between the leads 47 and 47' and the flanges may be provided as a cladding of copper on each of the flanges, and, in some instances, as a copper plating on the leads. The brazing material for the joints between the leads 47, 47', and 48 and the wafer 37 is provided in the form of a brazing material washer assembly 60. Assembly 60 comprises a plurality of washers 64 connected together by bridges 66, the assembly 60 being stamped or otherwise processed from a sheet of suitable brazing material, such as copper. The washers 64 in assembly 60 are accurately disposed with respect to one another so that the pattern of washers corresponds exactly with the pattern of the leads 47, 47', and 48. It has been found more convenient to use a brazing material assembly 60 of the type shown rather than individual brazing material washers threaded one by one onto each of the leads 47 and 48.

In the assembly of the electron tube mount 12 described, electrodes 26 and 27 and electrode support 28 are first inserted into jig 12 and disposed around or within jigging cylinders 18 and 19. Thereafter, flanges 30, 31 and 32 are placed on the ends of their corresponding electrodes or electrode support. In a preliminary operation, two leads 48 are inserted through bores 45 in wafer 37 and the heater element 51 secured to the leads 48 by crimping. Thereafter, the wafer-heater sub-assembly is placed in the jig 10 with heater element 51 disposed within electrode support 28 and wafer 37 resting on insert 23. The remaining leads 47 and 47' are then passed through the wafer bores 42–44 until the leads engage and rest on the various flanges.

Of the three leads 47 and 47' which engage each flange, two of the leads 47 serve only as supports for the flanges and extend only a small distance beyond wafer 37. The third lead 47' engaging each flange serves both as a support lead for the flange and as an electrical terminal for the electrode secured to the flange. To this end, the leads 47' extend considerably beyond wafer 37 so that electrical connections can be made thereto. The heater element leads 48 also serve as electrical terminals for heater element 21 and extend beyond wafer 37 a distance equal to the extending length of leads 47'. Thus, for an electron mount as shown in FIG. 1 there are six support leads 47 which extend only a small amount beyond wafer 37 and five support and conductive leads 47' and 48 which extend an appreciable distance beyond wafer 37.

The brazing material is in the form of an apertured assembly 60 of washers 64 thereafter threaded onto all the leads 47, 47', and 48 and positioned closely adjacent wafer 37. The loaded jig 10 is then placed in a furnace where the brazing material is heated and caused to melt. The brazing material in the washer assembly 60 flows into the various wafer bores 42, 43, and 44, and brazes the various leads to the wafer 37. Also, the brazing material on the flanges 30, 31, and 32 brazes the various leads to the flanges, and the various flanges to the electrodes and electrode support.

For the purpose of providing strain-free brazed joints, the various mount parts are assembled in jig 10 in strain-free relation. Thus, the tubular portions 34 of flanges 30, 31 and 32 are received snugly but not tightly around the ends of electrodes 26 and 27 and electrode support 28. Leads 47 and 47' merely rest on the flanges, and the bores through the wafer 37 are larger in diameter than the leads to permit the leads to pass freely therethrough. Prior to brazing, therefore, the mount parts are only loosely assembled within the jig and the mount is subject to damage if the jig or parts therein are roughly handled. To prevent damage to the assembled mount, it is desirable that during threading of the washer assembly 60 onto the leads 47, 47', and 48, none of the leads be pushed downwardly against the flanges. Such a pushing may cause tilting of the flanges or possible crushing of the fragile electrodes on which the flanges are supported.

It is found that the ends of the six support leads 47 are sufficiently accurately positioned with respect to each other by wafer 37 that they accurately register with their corresponding washers 64 in the washer assembly 60. Because of the long extending length of leads 47' and 48, however, it is found that due to the tilt permitted by the loose fit of these leads within their respective wafer bores, the free ends of the leads 47' and 48 may be so inaccurately disposed with respect to one another that the leads do not accurately register with their corresponding washers in the assembly 60. Therefore, prior to threading of assembly 60 onto leads 47' and 48, it is desirable to accurately position the free ends of leads 47' and 48, with respect to one another and with respect to their corresponding washers 64 in assembly 60. Specifically, it is desired that the tilt of the leads be eliminated and that the leads be centered within their respective bores.

Figure 3:
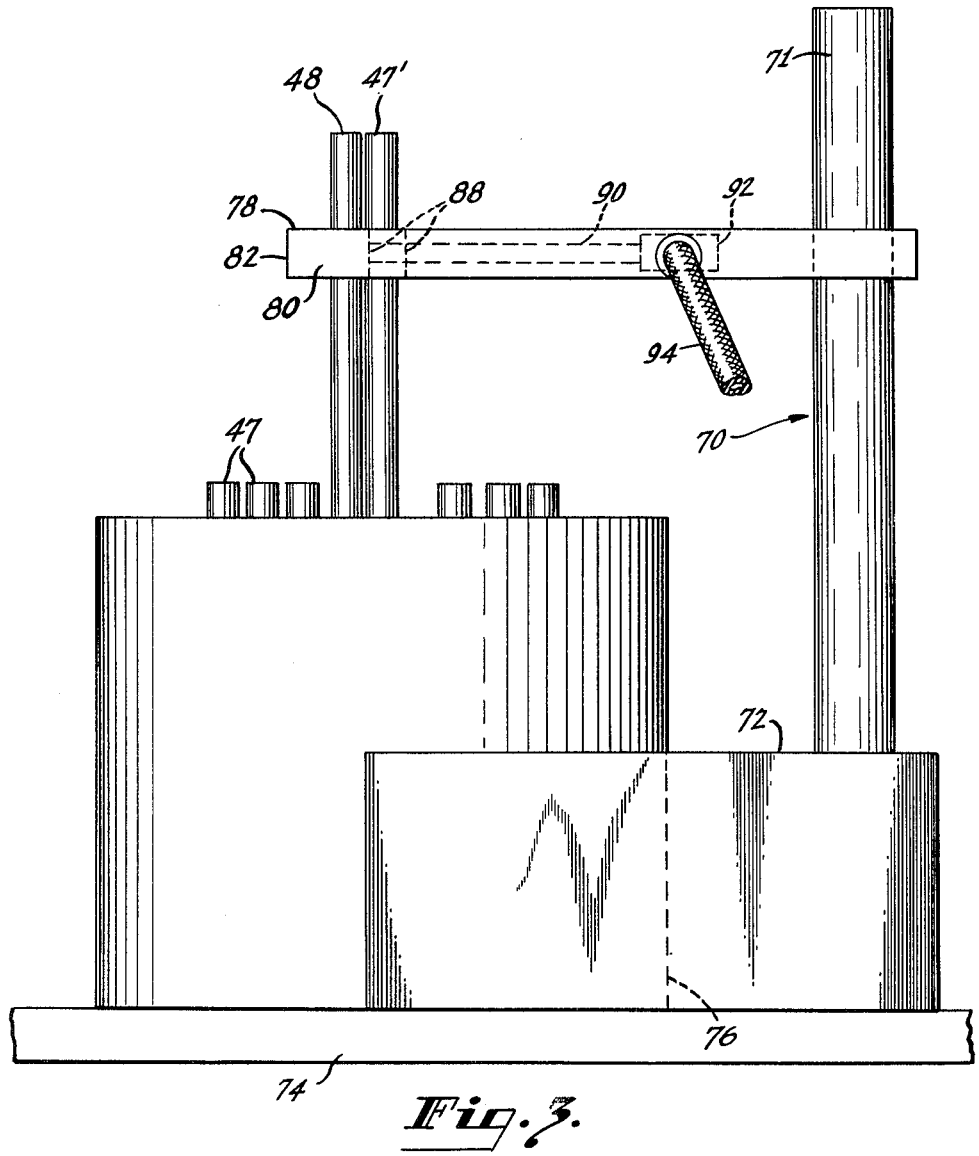
FIG. 3 is a side elevation showing apparatus which may be used in the practice of the method of this invention for accurately positioning the leads extending outwardly from a loaded jig; and, FIG. 4 is a top plan view of FIG. 3.

For accurately positioning leads 47' and 48 without exerting longitudinal forces against the leads, the apparatus as shown in FIGS. 3 and 4 may be used. The lead positioning apparatus 70 comprises a vertical standard 71 mounted on a support block 72 supported on table 74. Support block 72 has a concave stop 76 formed therein whereby a loaded jig 10 may be disposed in accurate relation with respect to standard 71. Mounted on standard 71 and extending horizontally therefrom and over stop 76 is a lead gathering and positioning tool 78. Tool 78 comprises a plate member 80 having one end 82 provided with five parallel slots 84 extending inwardly therefrom. Each slot 84 has inwardly tapering sides 86. Each slot 84 terminates in an inner end 88. The inner ends 88 of slots 84 and stop 76 are so disposed with respect to one another that when a jig 10 is positioned against stop 76, leads 47', and 48 will be centered in their respective wafer bores when the leads are engaged with the slot ends 88. Communicating with the end 88 of each slot is a bore 90 which extends through comb 80 and into a larger bore 92 which communicates, in turn, with a hose 94 connected to a continuously operating exhaust means (not shown).

In operation, an operator places a loaded jig 10 on table 74 adjacent support block 72 and angularly orients the jig so that each of the five extending leads 47' and 48 is disposed adjacent a corresponding slot 84 in tool 78. Thereafter, the operator moves the jig inwardly and against stop 76 whereby the leads are moved inwardly of the slots. The tapered sides 86 of the teeth of the comb 80 guide the leads towards the ends of the slots. Depending on the direction of tilt of the leads 47' and 48, the leads will either engage the inner ends 88 of slots 84 or be positioned closely adjacent the slot ends 88 when the jig 10 is pressed against stop 76. With respect to the leads not moved into engagement with the slot ends by movement of the jig 10, the ambient air pressure resulting from establishing a vacuum within the slots 84 at the proximal ends of the teeth 86 through bores 90 causes these leads to be moved towards and against the slot ends 88. Once in position against the slot ends 88, either by movement of the jig 10 or by movement of the leads under the influence of the vacuum, all the leads are maintained against the slot ends by the ambient air pressure.

Thereafter, the operator registers washer assembly 60 with the positioned leads 47' and 48 and threads the assembly 60 onto the ends of these leads extending above tool 78. The operator then moves the jig outwardly from the positioning apparatus 70 and the washer assembly 60 falls of its own weight onto the remaining leads 47. The remaining leads 47 are in register with their corresponding washers and no further positioning of the leads or washer assembly is required. It is found that if the washer assembly 60 does not fall of its own accord onto the remaining leads 47, a gentle push on the washer assembly in sufficient to complete the threading operation.

It is clear that the method described has several advantages. Firstly, no longitudinal forces are applied against the leads. The leads are moved transversely of their lengths inwardly of the slots and the sides of the slots exert transverse positioning forces against the leads. The urging of the leads by the ambient air pressure is also in a direction transverse to the length of the leads. Once the extending leads are accurately positioned, the brazing washer assembly 60 is easily simultaneously registered with all the leads.

Further, the lead positioning and threading operation may be performed rapidly. The large openings of slots 84 permit rapid registery of the leads with the slots. The exhaust means are in continuous operation, and the leads are positioned immediately upon being disposed adjacent the slot ends. After threading of the assembly 60 onto the leads, the jig 10 may be readily removed from the positioning apparatus since the amount of air pressure required to position and maintain the loosely supported leads against the ends of the slots is very small and easily overcome by the operator.

What is claimed is:

1. In the art of manufacturing an electron-tube of the kind in which a plurality of parallelly arranged wire-like elements extend from a base and in the manufacture of which an apertured structure is to surround individual ones of said parallel elements, a method of establishing and maintaining said parallel arrangement of said elements with the aid of a comb-like structure having teeth spaced to receive therebetween individual ones of said elements, said method comprising:

moving said lead-containing base relative to said comb into a position whereat individual ones of said wire-like elements are received between adjacent ones of said teeth, establishing a vacuum adjacent to the proximal ends of said adjacent teeth to draw and to hold said wire-like elements in the desired parallel relationship, and maintaining said vacuum while placing said apertured structure about said wire-like elements in a position whereat individual ones of said elements extend into individual ones of the apertures in said apertured structure.

2. In the art of manufacturing an electron-tube of the kind comprising an apertured base within the apertures of which a plurality of parallelly arranged wire-like elements are hermetically sealed with the aid of a brazing material; a method of establishing and maintaining said parallel arrangement of said wire-like elements with the aid of a comb-like structure having teeth spaced to receive therebetween individual ones of said elements, said method comprising:

inserting said wire-like elements in respective ones of the apertures of said wafer-like base, moving said element-containing base relative to said comb into a position whereat individual ones of said elements are received between adjacent ones of said teeth, establishing a vacuum adjacent to the proximal ends of said adjacent teeth to draw and to hold said wire-like elements in the desired parallel relationship, and maintaining said vacuum while placing said brazing material about said wire-like elements.

3. In the art of manufacturing an electron-tube of the kind comprising an apertured wafer-like base through the apertures of which a plurality of parallelly arranged wire-like elements respectively extend and are hermetically sealed to the walls of said apertures by a brazing material derived from an apertured structure whose apertures surround individual ones of said wire-like elements, a method of establishing and maintaining said parallel arrangement of said elements with the aid of a comb-like structure having teeth spaced to receive therebetween individual ones of said elements, said method comprising:

placing said wire-like elements in respective ones of of the apertures in said wafer-like base, moving said element-containing base relative to said comb into a position whereat individual ones of said elements are received between adjacent ones of the teeth of said comb, establishing a vacuum adjacent to the proximal ends of said adjacent teeth to draw and to hold said wire-like elements into the desired parallel arrangement, and maintaining said vacuum while placing said apertured structure of brazing material about said wire-like elements.

References Cited by the Examiner
UNITED STATES PATENTS

| | | | |
|---|---|---|---|
| 1,616,188 | 2/27 | Hatcher. | |
| 2,425,127 | 8/47 | Schafer | 29—25.19 |
| 2,644,998 | 7/53 | Klinkert et al. | 29—25.14 |
| 2,782,574 | 2/57 | Copold | 248—363 X |

WHITMORE A. WILTZ, *Primary Examiner.*

THOMAS H. EAGER, *Examiner.*